United States Patent

[11] 3,547,369

[72] Inventor Frank R. Potucek
Lake Zurich, Ill.
[21] Appl. No. 759,353
[22] Filed Sept. 12, 1968
[45] Patented Dec. 15, 1970
[73] Assignee Bell & Howell Company
Chicago, Ill.
a corporation of Illinois

[54] FILM TENSION CONTROL DEVICE
11 Claims, 3 Drawing Figs.
[52] U.S. Cl. .................................................. 242/75.52
[51] Int. Cl. ..................................................... B65h 77/00
[50] Field of Search .......................................... 242/75.52,
75.51

[56] References Cited
UNITED STATES PATENTS
2,214,355 9/1940 Tiselius et al. ................. 242/75.51
2,988,294 6/1961 Neff ............................. 242/75.52X
3,244,954 4/1966 Branco ......................... 242/75.52UX Primary Examiner—Nathan L. Mintz
Attorney—Finnegan, Henderson & Farabow ABSTRACT: A film tension control device is provided that controls the rotation of a film-winding reel to maintain constant and uniform tension in the film. The device uses signals from both coarse and fine sensing elements to control the torque of the motor driving the reel. The coarse sensing element senses the size of the roll of film on the reel to prevent gross changes in film tension and the fine sensing element senses the actual tension in the film to provide the fine control necessary to maintain uniform film tension. The device includes a reel drive control having means for receiving and combining the signals from the two sensing elements, and means for providing an output, to the motor, which is proportional to the combined signals.

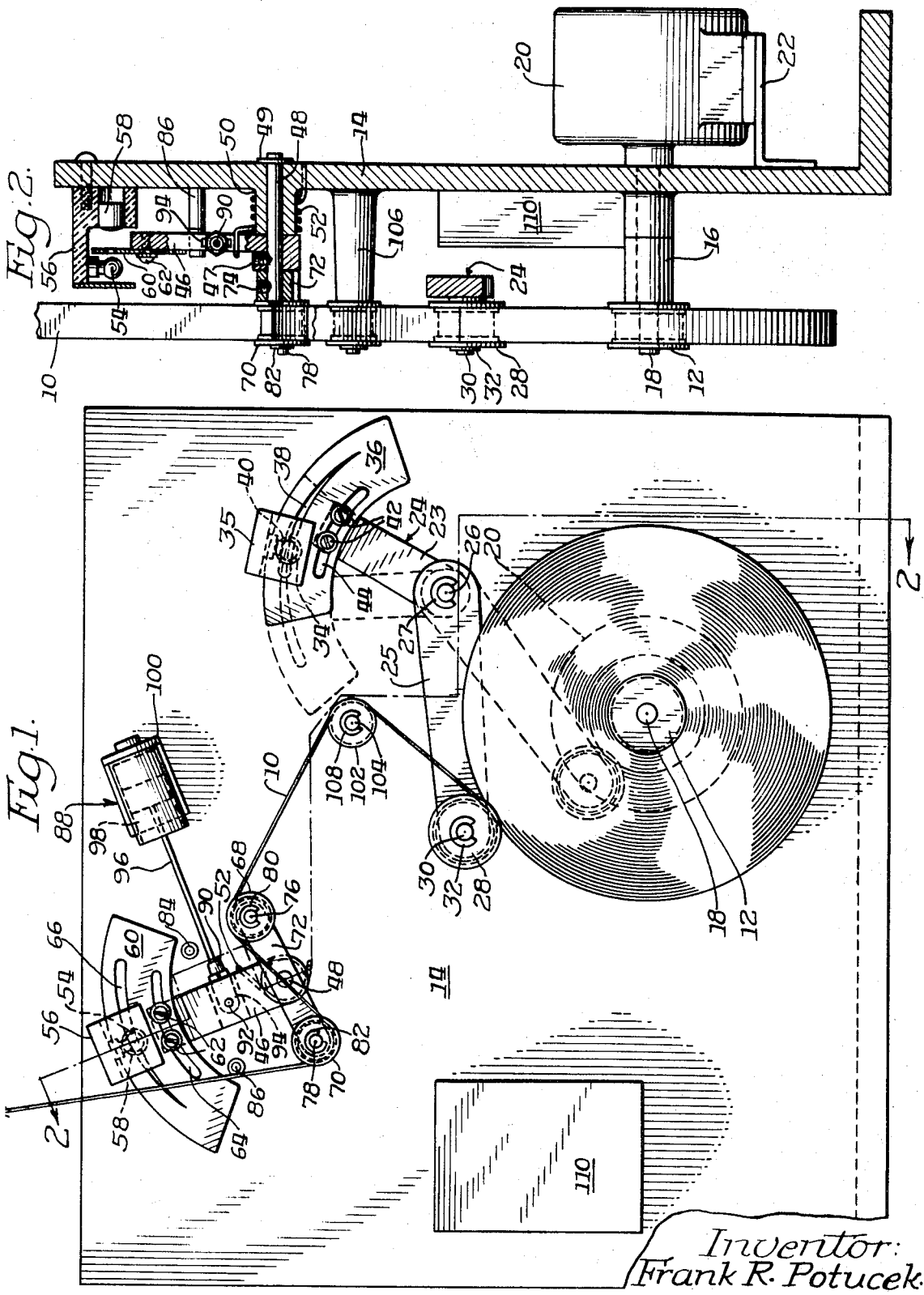

Inventor:
Frank R. Potucek.

Finnegan, Henderson & Farabow
Atty's.

FILM TENSION CONTROL DEVICE

This invention relates to tension control devices and more particularly to tension control devices which permit the control of tension for elongated flexible material within narrow limits under all conditions of stopping, starting, changes in reel sizes, and normal running of devices utilizing such material. Such devices include motion picture cameras, projectors, film printers, tape recorders, and the like.

As used herein, the phrase "elongated flexible material" is intended to include films, tapes, wires, ribbons, threads, string, and sheet material or other similar materials.

As a particular example by which the invention may be illustrated, this disclosure sets forth in detail its application to the winding and reeling of motion picture film. It is to be understood that this invention is not to be construed as limited thereto, since this material has been selected solely for purpose of illustration.

It is generally recognized that it is desirable in the art of winding and reeling to perform this operation at a constant linear speed in terms of the material being reeled and with a constant tension on the material being reeled.

While this may be a desirable attribute as far as the winding and the reeling of some materials is concerned, it frequently happens, and especially with motion picture film, that the necessity for constant linear speed and constant tension is mandatory. It is therefore a primary object of this invention to provide means for winding and reeling at constant speed and at a constant tension.

It is well known that in driving an elongated flexible material, such as a motion picture film, from one reel to another, or from any source to a given winding reel, that the effective diameter of the reel or reels will vary continuously. Thus the reels necessarily cannot be driven at a constant angular velocity (i.e., at a constant r.p.m.), if constant linear velocity of the film is to be achieved. It has usually been the practice in the past to drive the film primarily by an apparatus that applies power directly to the film (sprockets in the case of perforated film or frictional rollers in the case of nonperforated film) and to drive or to brake the reels onto which the film is wound by means of a slipping or frictional clutch or brake so that reels can keep pace with velocity of the film.

Such devices, however, are wasteful of power and impose undue strain upon the film at the point where it passes between the constant speed drive mechanism and the frictionally urged or restrained reeling mechanism. This strain frequently 5 up undesirable side effects such as "chatter" that cause the mechanism to perform unsatisfactorily.

Furthermore, these devices tend to impose undue loads on the film itself which, in the case of perforated film, generally have the undesirable result of causing the perforations to elongate and thereby permanently damage or even end the useful life of the film.

It is therefore an object of this invention to provide a new and improved means for winding an elongated flexible material on a reel at a substantially constant tension in which power is applied to the reel and not directly to the film.

In the past, devices have been suggested which sense the tension of film and attempt to control the drive means driving the the reel. However, particularly where large diameter rolls of material are used, the variations in the torque of the drive means required to maintain uniform film tension from a full roll to an expended roll, can be quite substantial. Thus, in the past, the tension-sensing devices that sensed the tension in the film had to be capable of providing an output covering a wide range of values. This broad range of control in many instances limits the sensitivity of the film tension-sensing means and consequently hinders the fine control necessary to maintain uniform film tension.

It is therefore another object of this invention to provide an improved sensing tension device in which a coarse control of the tension is provided through a roll diameter-sensing means and a fine control is provided through a film tension-sensing means.

Additional objects and advantages of the invention will be set forth in part in the description which follows and in part will be obvious from the description, or may be learned by practice of the invention, the objects and advantages being realized and attained by means of the instrumentalities and combinations particularly pointed out in the appended claims.

To achieve the foregoing objects and in accordance with its purposes as embodied and broadly described, the tension control device of this invention comprises a reel for supplying or receiving the elongated flexible material, a reel drive means for driving the reel, a roll size-sensing means for sensing the size of the roll of elongated flexible material on the reel and for providing a first signal to be used as a coarse control for the flexible material tension, a material tension-sensing means for sensing the tension in the material and providing a second signal to be used as a fine control for the material tension, and a reel drive control for controlling the torque of the reel drive means, the reel drive control having means for receiving and combining the first and the second signals and means for providing an output to the reel drive means which is proportional to the combined signals.

The reel drive control may include means for connection to an electrical power source and a servocircuit which receives the combined signals and uses the combined signals to control the voltage passing to the reel drive means.

Preferably, the servocircuit is a triac circuit which provides a fast response to changes in the signals.

The accompanying drawings illustrate one embodiment of the invention and, together with the description, serve to explain the principles of the invention. It is to be understood that both the foregoing general description and the following detailed description are exemplary and explanatory and are not restrictive of the invention.

In the drawings:

FIG. 1 is a front elevation of a tension control device constructed in accordance with the teachings of this invention;

FIG. 2 is a sectional view taken along line 2–2 of FIG. 1; and

Figure 3:
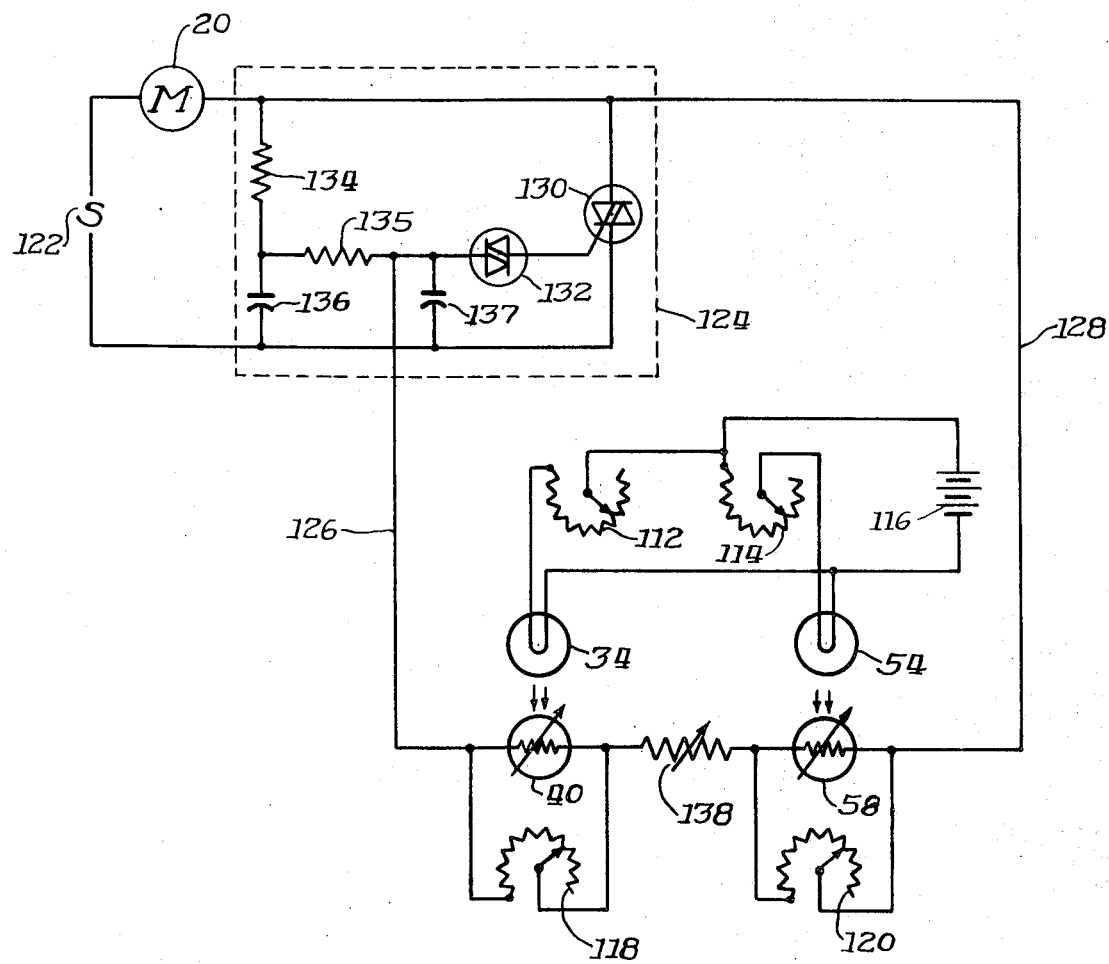
FIG. 3 is a schematic diagram of the electronic portion of the preferred embodiment of this invention.

Referring now to FIGS. 1 and 2, it may be seen that an elongated flexible material, here illustrated as a film 10, is being fed to a takeup hub or reel 12 which is generally one of a pair of spaced-apart reels. The other reel is not shown.

As will be understood by those skilled in the art, the tension control device of this invention may be used with either the supply or takeup reel or with both. For purposes of illustration and ease of understanding, the invention will be described with the tension control device operating in conjunction with the takeup reel.

Reel 12 is mounted on a frame 14 and is driven by a shaft 18 which extends a sleeve 16. A reel drive means in the form of a torque motor 20 is mounted on frame 14 by a bracket 22.

Motor 20 has its output shaft connected to shaft 18 to permit motor 20 to drive reel 12.

In accordance with the invention, a roll size-sensing means is provided for sensing the size of the roll of material on the reel. The means provides a first signal for controlling the torque of the motor relative to the roll size to prevent gross changes in film tension. As the roll size increases, it is necessary to increase the torque of the motor to accommodate the heavier roll. Conversely as the roll size decreases the torque of the motor must be decreased. If the torque of the motor is not controlled, the peripheral speed of the reel will vary with roll size causing undesirable changes in the tension of the film.

As here embodied, the roll size-sensing means includes a bell crank arm 24 formed of two rigidly connected links 23 and 25. Arm 24 is pivotally mounted on frame 14 by a pivot pin 26 passing through the arm at a midportion thereof. Arm 24 is held on pin 26 by a snapring 27 that fits in a groove on the pin. A follower roller 28 is rotatably mounted on one end of arm 24 by a pin 30 and is held on the pin by a snapring 32 which fits in a groove in the pin.

The roll size sensing means, as here embodied, further includes a source of light, shown in FIG. 1 as a light bulb 34, mounted on a bracket 35, a photocell 40 also mounted on bracket 35, and a shutter 36 mounted on the end of arm 24 between light 34 and photocell 40. Shutter 36 is in the shape of an arcuate segment and has an elongated arcuate opening 38 that increases in size progressively from one end to the other. Opening 38 of shutter 36 is aligned with light 34 so that the light beam will pass through opening 38 and strike photocell 40 which is aligned with light 34.

The varying size of opening 38 permits changes in the angular position of pivot arm 24 and hence changes in the angular position of shutter 36 caused by variations in the size of th roll of film to cause corresponding changes in the amount of light passing through opening 38 and striking photocell 40. Further, the arcuate shape of opening 38 permits the opening to be always aligned with light 34 and photocell 40 when the arm 24 is pivoted. Shutter 36 is connected to pivot arm 24 by two adjustment bolts 42 that extend through a slot 44 in the arm to permit the position of shutter 36 to be adjusted with respect to pivot arm 24.

The exact shape of opening 38 in shutter 36 can be varied to obtain linear response in the torque motor 20. Thus, shapes other than the teardrop shape illustrated may be used.

In FIG. 1, the roll size-sensing means is shown in full lines with a large amount of film wrapped on reel 12. The position of pivot arm 24 and shutter 36, when a small amount of film is on reel 12, is shown in phantom lines. As the amount of film wound on reel 12 increases, shutter 36 pivots clockwise from the position illustrated in phantom lines to the position illustrated in full lines.

It may be readily seen that in all positions the opening in the shutter will be aligned with light 34 and photocell 40. However, as shutter 36 moves upward in response to increases in roll size, increasing amounts of light will pass through shutter 36 to photocell 40 because of the increasing size of opening 38.

The weight of the upper end of pivot arm 24 and of shutter 36 causes roller 28 to always rest against the surface of the film on reel 12. If this weight is insufficient it will be obvious to those skilled in the art that a spring could be mounted about pivot pin 26 and engage arm 24 to forcibly urge roller 28 against the film roll.

In accordance with the invention a tension-sensing means is provided for sensing actual tension in the film and providing a second signal in combination with the first signal for controlling fine changes in the tension material.

As here embodied, the tension sensing means includes a pivot arm 46 mounted by a setscrew 47 on a pivot pin 48. Pin 48 extends through a sleeve 50 and is mounted on frame 14 by a snap ring 49. A coil spring 52 is mounted around sleeve 50 with one end of the spring acting on pivot arm 46 and the other secured to frame 14.

In the present embodiment, the tension-sensing means also includes a light bulb 54, and a photocell 58 both mounted by a bracket 56 to frame 14, and a shutter 60 which is mounted on the end of pivot arm 46 by adjustment bolts 62 that extend through an arcuate slot 64 in the arm. The arrangement permits the position of the shutter to be adjusted with respect to the position of pivot arm 24. Shutter 60 includes an elongated arcuate opening 66 which increases progressively in size from one end of the shutter to the other. Opening 66 is positioned between light 54 and photocell 58. The arcuate shape of the slot of the opening permits the opening to remain aligned with the light and photocell when pivot arm 46 pivots on pivot pin 48. Here again, shapes other that than the teardrop shape may be used.

In accordance with one embodiment of the invention and as shown in FIG. 1, the film tension-sensing means also includes a pair of spaced rollers mounted on opposite sides of the pivot axis of pivot arm 46 and the film is threaded over one side of roller and over the opposite side of the other roller.

As here embodied, rollers 68 and 70 are mounted on an arm 72 that is also secured to pivot pin 48 by setscrew 74 and hence arm 72 and 46 pivot together on pivot pin 48. Arm 72 is perpendicular to pivot arm 46 and has two pivot pins 76 and 78 which mount rollers 68 and 70, respectively. Snap rings 80 and 82 fit in notches on pivot pins 76 and 78 to hold rollers 68 and 70, respectively, in position.

As may be best seen in FIG. 1, the film is threaded across the right-hand side of roller 70 and then across the left-hand side of roller 68.

An increased tension on the film 10 will cause arm 72 and pivot pin 48 to rotate clockwise, which in turn causes arm 46 to rotate clockwise against the force of spring 52, while decreases in tension on film 10 will permit spring 52 to urge pivot arm 46 counterclockwise. Clockwise movements of arm 46 and attached shutter 60 permit decreasing amounts of light to pass through opening 66 in shutter 60 and counterclockwise movement movements of shutter 60 permit increasing amounts of light to pass through the opening.

Studs 84 and 86 mounted to frame 14 are located on opposite sides of pivot arm 46 to limit the movement of pivot arm 46.

In accordance with one embodiment of the invention a dashpot is connected to pivot arm 46 to dampen out any dynamically induced oscillations. As here embodied, the dashpot, generally 88, includes a connector 90, pivotally connected to pivot arm 46 by a pivot pin 92 in a slot 94 in pivot arm 46. A stem 96 extends from connector 90 to a ram 98 mounted in a cylinder 100 which is pivotally mounted on frame 14 to permit the dashpot to continue to operate without binding through the full range of operation of pivot arm 46.

An idler roller 102 is mounted on a pivot pin 104 which passes through a sleeve 106 and is secured to frame 14. A snapring 108 fits in a groove in pivot pin 104 to hold idler roller 102 in position. As may be seen, the film passes over one side of roller 70, the other side of roller 68, over idler roller 102, past roller 28 and on to reel 12.

In accordance with the invention, a reel drive control is provided for controlling the torque of the reel drive means. The reel drive control has means for receiving and combining the signals received from the roll size-sensing means and the tension-sensing means and for providing an output to the reel drive means that is proportional to the combined signals.

As here embodied, the reel drive control includes a circuit contained in a box designated 110 on FIGS. 1—2.

Referring now to the schematic circuitry shown in FIG. 3, it may be seen that lights 34 and 54 are connected through rheostats 112 and 114 to a source of direct current, such as a battery 116. Photocells 40 and 58 are each connected in parallel with a variable rheostat 118 and 120, respectively. In accordance with the invention, the reel drive con control has means for receiving and combining the first and second signals. As here embodied, the output from photocells 40 and 58 are combined by connection of the two photocells in series through a variable resistor 138.

The reel drive control includes means for connection to an electrical power source indicated schematically as 122. The means for connection to the power source 122 may be a conventional plug and socket arrangement.

In accordance with the invention, the reel drive control also includes a servo circuit generally indicated as 124 which receives the combined signals and uses the combined signals to control the voltage passing to motor 20. As here embodied, the servo circuit includes a triac circuit that provides a fast response to changes in the combined signal. The triac circuit is connected to photocells 40 and 58 through connectors 126 and 128 and includes a triac 130 connected between the source of power 122 and the reel drive motor 20. A diac 132 is connected between the photocells 40 and 58 and the gate of triac 130. Thus, signals from photocells 40 and 58 pass through diac 132 to control the gate of triac 130 which in turn permits voltage proportional to the signals received from the two photocells to pass to motor 20. Appropriate resistors 134 and 135 and appropriate capacitors 136 and 137 complete the servocircuit.

The operation of the tension control device of this invention is as follows: As the amount of film on reel 12 increases, the torque required to turn the reel increases. If the torque provided by motor 20 remains constant, the reel will slow down and the tension in the film will be decreased. However, as the diameter of the film on reel 12 increases, pivot arm 24 pivots clockwise and hence shutter 36 moves clockwise bringing the larger portion of shutter opening 38 into alignment with light 34 and photocell 40.

As the shutter opening increases, the intensity of light beam incident on the face of the photocell increases causing the resistance of the photocell to decrease. This resistance decrease causes an increased amount of voltage to pass through diac 132 to the gate of triac 130 which in turn causes an increased voltage from source 122 to pass to motor 20. The increase in the voltage to the motor increases the torque of the motor and hence maintains a constant tension in the film. Since outward movement of arm 24 continuously increases the torque of the motor with increasing roll size, changes in the film tension caused by roll size variations are substantially prevented. Concurrently, the film tension-sensing means is sensing the actual tension in the film. If the tension increases, for example, arm 46 pivots clockwise against the urging of spring 52. The clockwise movement of arm 46 moves shutter 60 clockwise causing the smaller portion of opening 66 to come in alignment with light 54 and photocell 58.

As the shutter opening decreases, the intensity of light on the face of the photocell decreases causing the resistance of the photocell to increase. This increased resistance lowers the voltage passing through diac 132 to the gate of triac 130 and hence lowers the voltage applied to the torque motor. The lower voltage decreases the torque of the torque motor which in turn decreases the tension on the film.

Thus increases in film tension cause arm 46 to pivot in a direction that will cause a decrease in the torque of the motor. This in turn results in reduced torque applied to the film reel, thus reducing the film tension until the balance condition is restored.

Correspondingly, decreases in film tension cause arm 46 to pivot in the opposite direction, allowing more light to pass through opening 66 and lowering the resistance of photocell 58. With decreases in cell resistance, the torque of the motor increases which in turn increases the tension on the film.

The invention in its broader aspects is not limited to specific details shown and described, but departures may be made from such details within the scope of the invention without departing from the principles of the invention and without sacrificing its chief advantages.

I claim:

1. An improved film tension control device for elongated flexible materials comprising:
   a reel for supplying or receiving the elongated flexible material;
   a reel drive means for driving the reel;
   a roll size-sensing means for sensing the size of the roll of material on said reel and providing a first signal used for coarse control of the tension on the material, said roll size-sensing means including a source of light and a photocell, with the light beam acting on the photocell;
   a tension-sensing means for sensing the tension in the material and providing a second signal used for a fine control of the tension on the material, said tension-sensing means including a source of light and a photocell, with the light beam acting on the photocell; and
   a reel drive control for controlling the torque of the reel drive means, said reel drive control having means for combining said first and said second signals and means for providing an output to said reel drive means that is proportional to said combined signals, said means for providing an output to said reel drive means having a circuit which uses said combined signal to control the voltage passing to the reel drive means, and said two photocells are connected to each other and to said circuit.

2. The device of claim 1 wherein said reel drive control includes means for connection to an electrical power source, and said circuit which uses the combined signals to control the voltage passing to the reel drive means is a servocircuit.

3. The device of claim 2 wherein said servocircuit is a triac circuit which provides a fast response to changes in the combined signal.

4. The device of claim 3 wherein said tension-sensing means includes a pivot arm, a spring acting on said pivot arm with the position of said pivot arm being determined by a balance of the spring force and the tension on the elongated flexible material, and a shutter mounted on said pivot arm between said source of light and said photocell to permit changes in the angular position of said pivot arm to cause corresponding changes in the shutter position and in the amount of light reaching said photocell.

5. The device of claim 4 wherein said shutter includes an elongated arcuate opening which increases in size from one end to the other and said opening is positioned between said source of light and said one photocell to permit changes in the angular position of said shutter to change the amount of light reaching said photocell.

6. The device of claim 4 wherein a dashpot is connected to said pivot arm to dampen out any dynamically induced oscillations.

7. The device of claim 4 wherein said tension-sensing means includes a pair of spaced rollers positioned on opposite sides of the pivotal axis of said pivot arm and the elongated flexible material is threaded over one side of one roller and over the opposite side of the other roller, whereby increases in tension of the material result in the pivoting of said pivot arm against the force of said spring and decreases in tension of the material result in pivoting of said pivot arm by said spring.

8. The device of claim 3 wherein said roll size-sensing means includes:
   a pivot arm;
   a roller on one end of said pivot arm which rests against the roll; and
   a shutter mounted on the other end of said pivot arm between said source of light and said photocell to permit changes in the angular position of said pivot arm to cause corresponding changes in the shutter position and in the amount of light reaching said photocell.

9. The device of claim 8 wherein said shutter includes an elongated arcuate opening which increases in size from one end to the other, and said opening is positioned between said source of light and said photocell to permit changes in the angular position of said shutter to change the amount of light reaching said photocell.

10. The device of claim 4 wherein said roll size-sensing means includes:
    a second pivot arm;
    a roller on one end of said second pivot arm which rests against the roll; and
    a second shutter mounted on the other end of said second pivot arm between said source of light and said photocell to permit changes in the angular position of said second pivot arm to cause corresponding changes in the position of said second shutter and in the amount of light reaching said one photocell.

11. The device of claim 10 wherein both said first and said second shutters include an elongated arcuate opening which increases in size from one end to the other with said opening being positioned between said source of light and said photocell to permit changes in the angular position of said shutter to change the amount of light reaching said photocell.